United States Patent [19]

Pinto

[11] Patent Number: 4,725,380

[45] Date of Patent: Feb. 16, 1988

[54] PRODUCING AMMONIA SYNTHESIS GAS

[75] Inventor: Alwyn Pinto, Middlesbrough, England

[73] Assignee: Imperial Chemical Industries PLC, London, England

[21] Appl. No.: 894,859

[22] Filed: Aug. 8, 1986

Related U.S. Application Data

[63] Continuation-in-part of Ser. No. 703,531, Feb. 20, 1985, Pat. No. 4,695,442, and a continuation-in-part of Ser. No. 868,666, May 30, 1986, which is a continuation-in-part of Ser. No. 703,531.

[30] Foreign Application Priority Data

Mar. 2, 1984 [GB] United Kingdom ................ 8405591
Jul. 4, 1984 [GB] United Kingdom ................ 8417016
Jul. 4, 1984 [GB] United Kingdom ................ 8417017
Oct. 9, 1984 [GB] United Kingdom ................ 8425508
Jun. 4, 1985 [GB] United Kingdom ................ 8513997
Jun. 18, 1985 [GB] United Kingdom ................ 8515392
Aug. 21, 1985 [GB] United Kingdom ................ 8520892

[51] Int. Cl.⁴ .............................................. C01C 1/04
[52] U.S. Cl. ................................. 252/376; 252/377; 423/359

[58] Field of Search ................ 252/376, 377; 423/359

[56] References Cited

U.S. PATENT DOCUMENTS 4,479,925 10/1984 Shires et al. .
4,553,981 11/1985 Fuderer .
4,592,860 6/1986 Fuderer ............................... 252/376

FOREIGN PATENT DOCUMENTS 2126573 9/1983 United Kingdom .

Primary Examiner—William R. Dixon, Jr.
Assistant Examiner—Wayne A. Langel
Attorney, Agent, or Firm—Cushman, Darby & Cushman

[57] ABSTRACT

Production of ammonia synthesis gas by partial oxidation of a hydrocarbon feedstock, using air, oxygen enriched air, or oxygen depleted air, in admixture with steam, followed by shift and the removal of the excess of nitrogen, and also impurities such as carbon oxides and methane, by pressure swing adsorption (PSA). The PSA waste gas is combusted and used to heat the air and/or steam prior to the use thereof in the partial oxidation.

9 Claims, 1 Drawing Figure

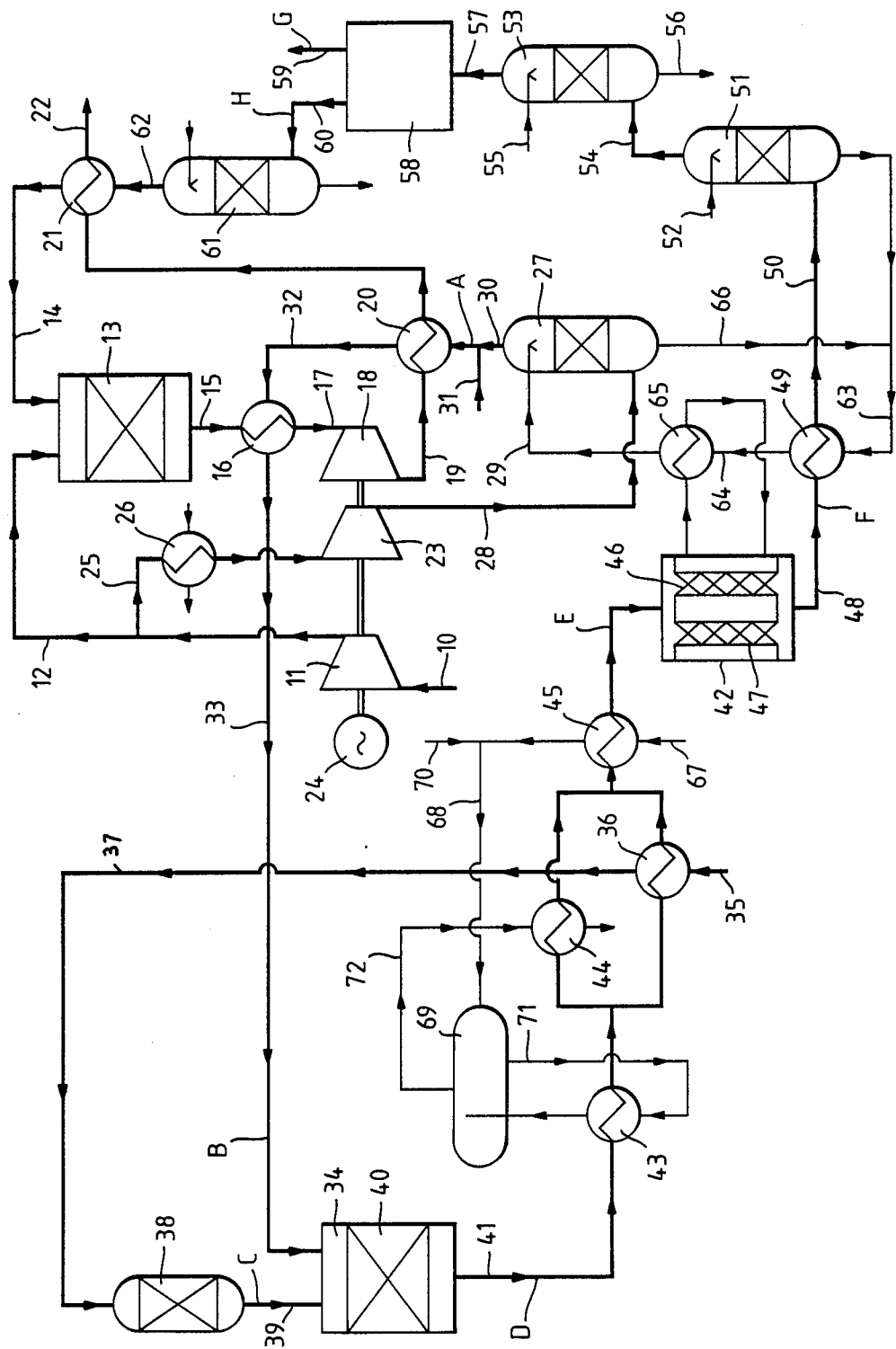

PRODUCING AMMONIA SYNTHESIS GAS

This application is a continuation-in-part of application Ser. No. 703,531 filed Feb. 20, 1985, now U.S. Pat. No. 4,695,442, entitled "Hydrogen and of application Ser. No. 868,666 filed May 30, 1986 entitled "Technical hydrogen", which itself is a continuation-in-part of the aforesaid application Ser. No. 703,531, now U.S. Pat. No. 4,695,442.

This invention relates to ammonia synthesis gas and in particular to a process of producing it from a reformable hydrocarbon feedstock.

In a well established conventional process for Producing ammonia synthesis gas, the following stages are involved:

(a) the feedstock is subjected to primary steam reforming by passing the feedstock and steam over an externally heated catalyst, thereby forming a primary reformed gas stream containing hydrogen, carbon oxides, methane, and unreacted steam;
(b) the primary reformed gas stream is subjected to secondary reforming by reaction with air and passing the resultant mixture over a catalyst so that the mixture is brought towards equilibrium; this stage has the effect of introducing air and reducing the methane content to a low level;
(c) the secondary reformed gas stream is subjected to the catalytic shift reaction with steam; this effects conversion of carbon monoxide to carbon dioxide with the concurrent production of more hydrogen;
(d) the unreacted steam is removed by condensation and most of the carbon dioxide is removed by scrubbing with a regenerable liquid absorbent; and
(e) the residual carbon monoxide and carbon dioxide is removed by methanation.

In the above process high grade heat is recovered as steam from the flue gases of the furnace providing heat for the primary reforming stage, and from the hot gases resulting from the secondary reforming and shift stages. Steam may also be produced by heat recovery from downstream operations such as the ammonia synthesis stage. Energy is recovered from this steam by letting it down through one or more turbines driving, or by way of electricity generation, the air compressor supplying air to the secondary reforming stage, the synthesis gas compressor, the circulator in an ammonia synthesis loop downstream of the methanation stage, and various other machines in the ammonia production plant. However the furnace of the primary reforming stage, and the regenerable absorbent system of the carbon dioxide removal stage, are large and expensive items, and so proposals have been made to replace them.

In particular GB-A-2126573 describes a process in which the primary reforming stage is omitted and the carbon dioxide removal stage is replaced by a pressure swing adsorption PSA system. In the specific ambodiment of GB-A-2126573 the process comprises the following steps:

heating the hydrocarbon in a fired heater;
adding steam to the hydrocarbon by saturation;
reacting the heated hydrocarbon with air, the amount of air added being such that a substantial excess of nitrogen over that required in the ammonia synthesis gas is incorporated;
cooling and converting some of the carbon monoxide in a shift stage;
further cooling the gas and separating the gas in a PSA stage into an ammonia synthesis gas stream and a waste gas stream, the latter containing the carbon dioxide, the excess of nitrogen, carbon monoxide, methane, and some hydrogen, and being used as fuel; and
methanating the ammonia synthesis gas stream.

Whereas in the embodiment specifically described the hydrogen recovery over the PSA and methanation stages, i.e. the ratio of the amount of hydrogen in the methanated gas to the amount of hydrogen in the feed to the PSA system, is only 72.4%, we have now devised an improved process applicable in the same general way as that of GB-A-2126573 but capable of operation at a substantially higher hydrogen recovery.

In the present invention this is achieved by reacting the hydrocarbon feedstock with a gas stream consisting of air (or oxygen-enriched or -depleted air) and steam and that is at a high temperature prior to the reaction with the hydrocarbon. In this way the amount of the excess of nitrogen that is incorporated, and hence to be removed in the PSA process, can be limited, thereby enabling a higher hydrogen recovery to be achieved.

Accordingly the present process provides a process for the production of ammonia synthesis gas comprising:

(a) forming a heated gas stream consisting of steam and a gas, containing nitrogen and oxygen and having an oxygen content in the range 15 to 35% by volume, selected from air, oxygen depleted air, and oxygen enriched air;
(b) reacting a hydrocarbon feedstock stream with said heated gas stream to give a reformed gas stream containing carbon oxides, hydrogen, nitrogen, methane, noble gases and excess steam, the reactant proportions and the process conditions being such that the volume ratio of the sum of hydrogen and carbon monoxide to nitrogen in said reformed gas stream is at least 1.2;
(c) cooling the reformed gas stream and subjecting the cooled gas stream to catalytic shift reaction under process conditions such as to produce a shifted gas stream having a carbon monoxide content under 1% by volume on a dry basis;
(d) cooling the shifted gas stream and separating unrested steam therefrom as liquid water so as to produce a raw gas stream;
(e) removing the carbon oxides, methane, and the excess of nitrogen from the raw gas stream, at least part of the carbon dioxide and carbon monoxide, tne excess of nitrogen, and methane being removed by a pressure swing adsorption process producing a product gas stream containing hydrogen and nitrogen and a waste gas stream containing carbon dioxide, nitrogen, methane, carbon monoxide, and some hydrogen; and
(f) burning the waste gas stream and, by heat exchange with the combustion products thereof, heating the steam and/or the gas containing nitrogen and oxygen, whereby the heated gas stream formed from said steam and said gas containing nitrogen and oxygen has a temperature above 500° C.

The hydrocarbon feedstock preferably has a boiling point, at atmospheric pressure, under 250° C. and is preferably LPG or natural gas. If the feedstock contains significant proportions of hydrocarbons having 4 or more carbon atoms, it may be desirable to convert it to "methane-rich" gas in a preliminary catalytic reaction with steam at a temperature under 550° C.

The gas containing nitrogen and oxygen is preferably air, but oxygen-enriched, or oxygen-depleted, air may be used if such a gas is available. For convenience the nitrogen and oxygen containing gas will hereinafter be referred to as air. The air and/or steam, or the mixture thereof, is heated, prior to the reaction with the hydrocarbon feedstock, so that the heated air/steam mixture has a temperature above 500° C., preferably above 700° C., and particularly in the range 750° to 850° C. The basi this feature of the invention is that steam and air can be heated so strongly without undergoing unwanted side reactions, unlike the hydrocarbon feedstock. The mixture of air and steam is conveniently made by contacting the air with hot water so as to produce saturated air: the resultant saturated air is then heated, prior to reaction with the feedstock, by heat exchange with the PSA waste gas combustion products. Where the air/steam mixture is made by saturation another advantage of the use of a heated steam/air mixture is that, because the volume of air required for the reaction is greater than that of the hydrocarbon feedstock, the volume of steam, and hence the quantity of heat, per unit volume of hydrocarbon feedstock introduced by saturation of the air is greater than if the hydrocarbon feedstock had been saturated.

The hydrocarbon feedstock may be preheated, alone or with steam, to as high a temperature as is practical, depending on the stability of the hydrocarbon feedstock. For methane this temperature is typically 400° to 500° C. in the absence of steam or 500° to 650° C. if mixed with steam.

The reaction of the steam/air mixture and hydrocarbon feedstock is conveniently effected at a pressure in the range 10 to 50, preferably 20 to 40, bar abs.

As a result of the strong preheating, the amount of oxygen required in the reaction with the hydrocarbon feedstock can be quite low, for example in the range 0.2 to 0.6 molecules of oxygen per atom of carbon in the hydrocarbon feedstock. This enables the stipulated volume ratio of hydrogen plus carbon monoxide to nitrogen in the reformed gas stream to be achieved. The temperature of the reformed gas leaving the reforming stage is preferably in the range 800° to 950° C. While the use of a relatively small proportion of air and such exit temperatures correspond to a relatively high methane content, for example in the range 0.5 to 1.5% by volume on a dry basis, in the reformed gas stream, in the present invention this is not disadvantageous since the fuel value of this methane is recovered in the combustion of the PSA waste gas.

The reaction between the heated air/steam mixture and the feedstock can be effected as in a secondary reformer by combustion in a flame zone and passing the resultant mixture over a refractory supported Group VIII metal catalyst to bring the mixture towards equilibrium. Alternatively the combustion can be catalysed, for example by a refractory supported platinum catalyst. In either event the catalyst is preferably of the honeycomb type. Non catalytic reaction is not excluded but is less convenient because it results in higher temperatures and steps have to be taken to deal with by-product carbon formation.

The hot reformed gas is then cooled. The cooling preferably includes heat exchange with water so as to produce steam, preferably at a pressure of over 20 bar abs. Where the present invention is to be used as a substitute for the synthesis gas generation stages of an existing ammonia plant, the steam pressure can be chosen to suit the steam system of that plant. A steam pressure in the range 20 to 60 bar abs. normally suffices when the steam is to be used directly as process steam (in which case the steam pressure should be above the pressure at which the hydrocarbon feedstock is reacted with the steam air mixture) or in condensing turbines, but higher pressures, e.g. over 70, and possibly up to 140, bar abs would be suitable if the steam is to be let down in pass-out turbines and the exhaust steam therefrom is to be used as process steam. If desired the steam can be used as a source of hot water for saturating air as aforesaid. After the cooling step the reformed gas stream will typically have a temperature below 400, preferably under 320, °C.

The shift readtion is effected under conditions such that the shifted gas contains less than 1, preferably less than 0.5% by volume of carbon monoxide on a dry basis. To achieve the preferred outlet carbon monoxide content, the shift exit temperature is preferably in the range 200° to 280° C. For this purpose the reformed gas may be cooled sufficiently, prior to shift, to provide that such a shift outlet temperature is achieved when using an adiabatic shift catalyst bed. However, it is preferred that the shift reaction is effected in indirect heat exchange with a coolant, especially water under pressure, so that the outlet temperature is 10° to 30° C. less than the inlet temperature. The extent of heat recovery from the shift reaction exotherm and from the sensible heat of the gas stream, coupled with avoidance of heat losses as a result of such a single heat recovery operation, means that in favourable cases the shift stage can provide all the steam required in the reforming stage. Thus the hot water produced from such a water cooled shift stage can be contacted with air to form the air/steam mixture to be used in the reforming stage. The hot water produced in such a shift stage can be in the partly boiling state when contacted with the air, or can be allowed to boil and then condensed in indirect heat exchange with water that is to be contacted with the air. The shift stage is more fully described in EP-A-157480. The shift catalyst is suitably metallic copper on a support.

After the shift reaction the shifted gas is cooled, preferably by heat exchange with water so as to produce hot water which may be used as feed for further heating by heat exchange with steam or hotter water produced in such a water cooled shift stage, and/or as boiler feed water feeding a boiler raising steam in the cooling of the hot reformed gas. If desired the cooling of the shifted gas can be at least partly by direct heat exchange with cold water, in which event the resulting hot water can be used for a direct contacting step, e.g. saturation of air.

The cooling after the shift reaction is to such an extent that the excess of steam in the shifted gas condenses: the condensed water is then separated.

In some applications of the invention, particularly where it is used to uprate an existing plant, some of the carbon dioxide in the shifted gas may be removed by a conventional "wet" carbon dioxide removal process in order to make use of this part of the existing plant. Where there is a "wet" carbon dioxide removal stage, this is preferably operated to give a gas stream containing 1 to 5% by volume of carbon dioxide on a dry basis. The carbon dioxide absorbent is preferably pressure sensitive, especially a tertiary amine such as methyldiethanolamine, or a physical solvent such as polyethylene glycol dialkyl ether ("Selexol"), since such absorbents require much less regeneration heat than, for example, monoethanolamine or aqueous potassium carbonate. If there is a "wet" carbon dioxide removal stage, some or all of the heat required for regeneration may be supplied by indirect heat exchange of the shifted gas with the carbon dioxide absorbent undergoing regeneration.

After cooling the shifted gas and separating condensed water therefrom, and after any "wet" carbon dioxide removal stage, the gas stream is subjected to a PSA stage. Where there is a "wet" carbon dioxide removal stage and this is conducted to give a carbon dioxide content in the resultant gas of below 1% by volume, after "wet" carbon dioxide removal the gas is preferably methanated prior to the PSA stage. The PSA stage is typically of the type described in EP-A-157480, EP-A-178833, or EP-A-183358, the disclosures of which are incorporated herein by reference.

In the PSA stage a product gas stream containing hydrogen and nitrogen in the proportions desired for downstream operations is produced together with a waste gas stream containing a small proportion of hydrogen, the excess of nitrogen, carbon monoxide, carbon dioxide, methane, and argon. This achieved by conducting the adsorption step such that "breakthrough" of nitrogen into the product gas stream occurs to such an extent that, integrated over the adsorption step, the product gas stream has the desired nitrogen content. The product gas stream will generally contain some argon as this will usually not be completely separated in the PSA stage. The PSA adsorbent can be of the conventional active carbon, zeolite A, or silica gel type, or combinations thereof. Advantageously there may be used an adsorbent that preferentially adsorbs carbon monoxide to nitrogen, for example mordenite, or sodium calcium zeolite X, in order to assure a low carbon monoxide content in the product gas.

As a result of conducting the shift reaction with an outlet carbon monoxide content below 1% by volume on a dry basis, the carbon monoxide content of the product gas stream may, in some cases, be sufficiently low that a subsequent methanation stage is not necessary to reduce the carbon monoxide content to such a level that it will not poison the ammonia synthesis catalyst, particularly where the latter comprises ruthenium. In other cases it may be desirable to include a methanation stage, particularly where the ammonia synthesis is conducted with an iron catalyst, perhaps simply as an insurance. Where there is a methanation stage following the PSA, it will be appreciated that some hydrogen will be utilised in methanation and so the degree of nitrogen "break-through" in the PSA stage should be such that, after methanation, the gas stream has the hydrogen to nitrogen ratio desired for the ammonia synthesis gas. While the stoichiometric ratio for ammonia synthesis is 3, in some cases it may be desirable to operate the ammonia synthesis step with a synthesis feed gas that has a hydrogen to nitrogen ratio as low as 2.7 or as high as 3.1.

In the process of the invention, PSA waste gas is combusted to provide heat for heating the steam and/or air. In some cases it may be desirable to separate carbon dioxide from the PSA waste gas prior to such combustion. Alternatively a PSA process such as that described in EP-A-178833 may be employed giving separate carbon dioxide-rich and carbon dioxide-lean waste gas streams may be employed, and only the carbon dioxide-lean stream used in the combustion step. In particular, it is preferred to operate the PSA stage such that the waste gas stream that is to be use for the combustion has a pressure over 1, especially in the range 3 to 5, bar abs. so that it can be let down in a gas turbine to recover useful power and, where desired, it can be readily processed to recover carbon dioxide.

The waste gas that is to be burnt is preferably combusted in a catalytic combustor, particularly where it contains a substantial amount of carbon dioxide: if desired the waste gas may be compressed prior to combustion. The combustion products are then heat exchanged with the air and/or steam to be fed to the reforming stage, and then preferably expanded with the performance of work, suitably in a gas turbine. This turbine may drive, directly or via the generation of electricity, one or more of the large machines in the plant, especially the air compressor supplying the combustion air and the process air to be fed to the reforming stage, and, if employed, the compressor compressing the waste gas prior to combustion. In this way there is obtained a high recovery of useful energy from the methane content of the waste gas, and so from the methane present in the reformed gas as a result of the use of a relatively limited amount of air in the reforming stage.

One preferred process for the production of ammonia synthesis gas is described with reference to the flowsheet shown in the accompanying drawing.

In this embodiment air is fed, via line 10, to a first stage air compressor 11 where it is compressed to an intermediate pressure. Part of this compressed air is fed, via line 12, to a catalytic combustor 13 where it serves as combustion air for the combustion of a PSA waste gas stream fed to the combustor 13 via line 14. The combustion products are fed, via line 15, to a heat exchanger 16 and then, via line 17, to a turbine 18. The exhaust from the turbine 18 is passed, via line 19 to heat exchangers 20 to 21 and then discharged to the atmosphere via line 22. Turbine 18 drives compressor 11, a second stage air compressor 23, and an alternator 24 producing electricity.

The remainder of the compressed air from compressor 11 is fed, via line 25, to a heat exchanger 26 where the air is cooled, and then to the second stage air compressor 23 wherein it is compressed to the process pressure. The compressed air is fed from compressor 23 to a saturator tower 27 via line 28. In tower 27 the air is contacted with hot water fed to the tower 27 via line 29. The resultant saturated air is then passed, via line 30, to heat exchanger 20. Further steam may be added, if availble, via line 31, to the saturated air. The steam/air mixture, stream A, is superheated in heat exchanger 20 by heat exchange with the turbine exhaust and then fed, via line 32, to heat exchanger 16 wherein the superheated steam/air mixture is strongly heated by heat exchange with the combustion products from the catalytic combustor 13. The resultant hot steam/air mixture, stream B, is then fed, via line 33, to a partial oxidation reactor 34. If desired heat exchanger 20 can be omitted so that the steam/air mixture is fed directly from saturator tower 27 to the heat exchanger 16.

Natural gas, to which the purge stream from the ammonia synthesis loop (not shown) is added, is fed, via line 35, to a heat exchanger 36 wherein it is heated, and then passed, via line 37, to a desulphuriser 38, which contains a bed of cobalt-molybdena-alumina granules followed by a bed of zinc oxide granules. The resultant desulphurised gas, stream C, is fed to the partial oxidation reactor 34 via line 39.

In partial oxidation reactor 34 the desulphurised natural gas is partially combusted with the hot steam/air mixture fed via line 33 at a suitably designed burner forming a flame, or over a combustion catalyst, and the partially combusted mixture is brought towards equilibrium over a refractory-supported nickel catalyst 40. The resulting hot reformed gas stream, which typically is at a temperature of 800° to 950° C., contains hydrogen, carbon monoxide, carbon dioxide, nitrogen, steam, and minor quantities of noble gases and methane. This hot reformed gas stream, stream D, is then fed, via line 41, to a series of heat exchangers wherein it is cooled to under 300° C., and thence, as stream E, to a shift reactor 42. The series of heat exchangers comprises a first heat exchanger 43, two heat exchangers 44 and 36 in parallel, and a heat exchanger 45.

The shift reactor 42 contains a pelleted copper-zinc oxide-alumina catalyst 46 disposed in tubes 47 cooled by heat exchange with water in the shell space surrounding the tubes. In the shift reactor carbon monoxide in the reformed gas reacts with steam to form carbon dioxide and hydrogen: The shift conditions are such that the carbon monoxide content is reduced to less than 1% by volume on a dry basis. The shifted gas, stream F, is then fed, via line 48, to a heat exchanger 49 wherein it is cooled and the ooolcd shifted gas stream is then fed, via line 50, to a packed tower 51 where it is freed of steam by contact with water flowing down the packing and fed to the tower 51 via line 52. Part of the carbon dioxide is then removed from the gas stream by feeding the gas from tower 51 to a carbon dioxide removal tower 53 via line 54. In tower 53 the gas stream encounters an absorbent solution fed to tower 53 via line 55 from a regeneration unit, not shown, to which the carbon dioxide loaded absorbent solution is fed via line 56. The carbon dioxide depleted gas stream is then fed, from tower 53, via line 57, to a pressure swing adsorption (PSA) unit 58. In an alternative process, the carbon dioxide removal tower 53 is omitted and the gas stream is fed directly from tower 51 to the PSA unit 58.

The PSA unit 58 contains 4 to 12 beds of an absorbent such as active carbon or calcium zeolite A or sodium calcium zeolite Y and has a control mechanism programmed to run the succession of steps of adsorption, pressure equalisation, depressurisation, purge, and re-pressurisation. The PSA unit provides two outlet streams, viz a product stream G in line 59 and a waste gas stream H in line 60. In the adsorption step of the PSA cycle, carbon oxides and methane, and some argon and nitrogen are adsorbed; the unadsorbed gas constitutes the product stream G. Each adsorption step is stopped at a time when sufficient nitrogen break through has occurred that, integrated over the whole of the adsorption step, the product stream has a hydrogen to nitrogen molar ratio of about 3. The resulting product stream G is fed, via line 59, to the ammonia synthesis loop, not shown, possibly by way of a methanation and drying stage. Where there is a methanation stage, the extent of break-through of nitrogen in the adsorption step should be such that, after methanation, the hydrogen to nitrogen molar ratio is at the desired level, viz about 3.

The waste gas stream H from the PSA unit contains nitrogen, carbon monoxide, methane, noble gases, some hydrogen, and also carbon dioxide to an extent depending on whether there is a carbon dioxide removal stage prior to the PSA unit. If the carbon dioxide content of the waste gas stream H is high and carbon dioxide is to be recovered, the waste gas is passed to a carbon dioxide removal tower 61, which is akin to tower 53, and thence, via line 62, to heat exchanger 21. If the carbon dioxide content of the waste gas stream H is low or carbon dioxide recovery is not required, tower 61 can be bypassed so that the waste gas is fed directly from the PSA unit 58 to heat exchanger 21. In heat exchanger 21 the waste gas is heated, by heat exchange with the exhaust from turbine 18, and the heated waste gas is fed to the catalytic combustor 13 via line 14.

The process make-up water is fed to the sytem via line 52 supplying cool water to tower 51. In tower 51 the water contacts the shifted gas rising up the tower and condenses water from the shifted gas. The resulting hot water stream taken from the bottom of tower 51 is united with recycled water and fed, via line 63, to heat exchanger 49 where it is heated by heat exchange with the shifted gas, and then, via line 64, to a heat exchanger 65 where it is further heated by heat exchange with condensing steam raised in the shell of the shift reactor 42. The heated water, which may be a water plus steam mixture, is then fed via line 29 to the top of the saturator tower 27. The cooled water excess from saturator tower 27 is taken as bottoms and fed via line 66 as the recycle water fed to line 63. If desired there may be one or more other make-up water feeds, not shown, additional to that fed via line 52. Since the process water either involves no boiling, or involves boiling only in heat exchange with condensing steam, i.e. in heat exchanger 65, it need not be of boiler feed water quality.

Boiler feed water, which has previously been deaerated and treated with corrosion inhibiting additives is fed, via line 67, to heat exchanger 45 which serves as a boiler feed water heater. The heated boiler feed water is then fed, via line 68, to a steam drum 69. Steam and/or hot water resulting from heat recovery in the ammonia synthesis loop, not shown, is also fed to line 68 via a line 70, to heat exchanger 43, which is heated by the hot reformed gas. Heat exchanger 43 serves as a boiler. Steam is taken overhead from steam drum 69 via line 72 and fed to heat exchanger 44 which serves as a superheater and then to users of high pressure steam, e.g. one or more steam turbines driving directly, or via electricity generation, one or more machines associated with the plant, or to a urea plant. If the high pressure steam is at a pressure of more than 70 bar abs., the exhaust steam from such turbines can be used as the source of steam fed to the saturated air via line 31. If the pressure of the high pressure steam is less than 70 bar abs., part of the steam can be used directly as the steam fed to the saturated air via line 31, and partly to power turbines exhausting to low pressure steam users or to a condenser.

The power obtained from turbines driven by the high pressure steam and by turbine 18 should be sufficient to drive not only air compressors 11 and 23, but also the various other machines (not shown) in the plant, e.g. the synthesis gas compressor, synthesis loop circulator, refrigeration compressor (if used), and the various pumps for liquids.

The carbon dioxide removal stage, employing tower 53, is preferably used if carbon dioxide is required as a product or for use in a urea plant or if the PSA stage 58 is designed to use a small waste gas flow rate or a relatively high waste gas pressure, or if the conditions of feedstock composition, temperature, pressure, and air-to-feedstock ratio in the partial oxidation reactor 34 lead to a shifted gas having a low hydrogen to carbon dioxide ratio. If the process of the invention is to be used to upgrade an existing plant by substitution for the conventional synthesis gas generation stages, the carbon dioxide removal stage of the existing plant can be used but is likely to have too low a capacity because, compared to conventional processes, in the present invention more hydrogen is produced by the overall reaction $$CH_4 + (O) + H_2O \rightarrow CO_2 + 3H_2$$

and less by the overall reaction.

$$CH_4 + 2H_2O \rightarrow CO_2 + 4H_2$$

The PSA unit 58 removes the carbon dioxide to the extent of the shortfall in capacity of the existing carbon dioxide removal stage. More economically the existing carbon dioxide removal stage is replaced by a simpler system designed to reduce the carbon dioxide content of the shifted gas down to a few percent instead of the conventional fractional percentage, or by a system using a pressure-dependent absorbent, since this uses less energy in regeneration than the conventional potassium carbonate or ethanolamine systems.

Carbon dioxide removal from the PSA waste gas in tower 61 is preferably adopted if, for example, high purity carbon dioxide is required as a saleable product.

Like the conventional process, the process of the present invention can be self-sufficient in energy. Assuming that the ammonia synthesis loop fed with the product gas via line 59 is operated at the same pressure and output as in the existing plant, the two processes compare as follows:

Energy consumers

The process of the present invention uses slightly less energy in synthesis gas compression and circulation since in the present process the product gas, after methanation if that is necessary, contains less noble gases and methane.

The process of the present invention uses about twice as much energy in air compression since, whereas the stoichiometry of the process of the invention typically requires about 1 mole of oxygen to produce 6 moles of hydrogen, in the conventional process the overall reaction typically is $$1.75\ CH_4 + 0.5\ O_2 + 2.5\ H_2O \rightarrow 1.75\ CO_2 + 6\ H_2$$

and thus typically requires only 0.5 mole of oxygen to produce 6 moles of hydrogen. (This calculation is of course only approximate because some hydrogen is "lost" from the gas stream into the PSA waste gas and also some hydrogen will be consumed in the methanation stage which is necessary in the conventional process and may be necessary, but to a lesser extent, in the process of the invention).

As explained above, in the process of the invention less energy is required in the carbon dioxide removal stage.

Energy recoveries

Although the reformed gas stream may be cooler in the process of the invention than in a conventional process, as a result of the excess of nitrogen, the total volume of reformed gas per unit output of hydrogen is greater in the present invention and that gas is cooled to a greater extent in the shift process when the preferred form of shift stage is utilised. The net effect is to give an increase in energy recovery from the reformed gas compared to the conventional process.

In the preferred process of the invention, there is no shift stage at a temperature over 350° C. and so cooling of the shifted gas does not contribute to high pressure steam generation. On the other hand, more heat is recovered upstream of shift and the shift heat evolution is directed to process steam provision by way of direct heat exchange of air with hot water and is thus used more efficiently.

In the process of the invention there is no furnace flue gas and so no heat recovery therefrom. As a consequence, the quantity of steam generated per unit of ammonia output is substantially less than in the conventional process.

In the conventional process the amount of energy recovered from waste gas is small as only ammonia synthesis purge gas, or residual gas resulting from hydrogen recovery from such purge gas, is available. In the process of the invention, however, PSA waste gas is combusted and energy is recovered both by heat exchange from the combustion products and by letting down the combustion products in a turbine. This energy recovery is sufficient to make up for what would have been available from the flue gas in the conventional process.

Calculated temperatures, T, (°C.), pressures, P, (bar abs.), and gas flow rates for the streams A to H in the synthesis gas generation stage of a plant producing ammonia at a rate of 420 te per day are shown in the following table. The flowsheet is as in the embodiment described above with the wet carbon dioxide removal stages, i.e. towers 53 and 61, omitted. The calculations assume the use of methane as the feedstock.

TABLE

| | T | P | Flow rate (kg mol/h) | | | | | | | | |
|---|---|---|---|---|---|---|---|---|---|---|---|
| | | | CO | $CO_2$ | $H_2$ | $CH_4$ | $N_2$ | $O_2$ | Ar | $H_2O$ | $NH_3$ |
| A | 226 | 36.5 | — | — | — | — | 1151 | 306 | 13 | 1690 | — |
| B | 800 | 36.5 | — | — | — | — | 1151 | 306 | 13 | 1690 | — |
| C | 480 | 37 | — | — | 109 | 600 | 50 | — | 10 | — | 6 |
| D | 907 | 36 | 318 | 251 | 1464 | 31 | 1204 | — | 23 | 1482 | — |
| E | 220 | 36 | 318 | 251 | 1464 | 31 | 1204 | — | 23 | 1482 | — |
| F | 220 | 35 | 6 | 563 | 1776 | 31 | 1204 | — | 23 | 1170 | — |
| G | 40 | 34 | — | — | 1660 | — | 554 | — | 10 | — | — |
| H | 40 | 4 | 6 | 563 | 116 | 31 | 650 | — | 13 | — | — |

The hydrogen recovery in the PSA stage is 93.5% as a result of the relatively high, viz 1.48, hydrogen/nitrogen volume ratio at the inlet of the PSA unit 58, which in turn is the result of:

relatively complete shifting in shift reactor 42 (to a carbon monoxide content of 0.17% by volume on a dry basis);

operating the partial oxidation stage with a moderate air feed rate (0.51 mol oxygen per atom of carbon in the hydrocarbon feedstock);

strong preheat of the air/stream mixture (to 800° C.); and a relatively high methane content (0.94% by volume on a dry basis) in the reformed gas.

I claim:

1. A process for the production of ammonia synthesis gas comprising:

(a) forming a heated gas stream at a temperature of at least 500° C. and consisting of steam and a gas, containing nitrogen and oxygen and having an oxygen content in the range 15 to 35% by volume, selected from air, oxygen depleted air, and oxygen enriched air;

(b) reacting a hydrocarbon feedstock stream with said heated gas stream to give a reformed gas stream containing carbon oxides, hydrogen, nitrogen, methane, noble gases and excess steam, the reactant proportions and the process conditions being such that the volume ratio of the sum of hydrogen and carbon monoxide to nitrogen in said reformed gas stream is at least 1.2, and the amount of nitrogen is in an excess of that required in the ammonia synthesis gas;

(c) cooling the reformed gas stream and subjecting the cooled gas stream to catalytic shift reaction under process conditions such as to produce a shifted gas stream having a carbon monoxide content under 1% by volume on a dry basis;

(d) cooling the shifted gas stream and separating unreacted steam therefrom as liquid water so as to produce a raw gas stream;

(e) removing carbon oxides, methane, and the excess of nitrogen from the raw gas stream, methane, the excess of nitrogen, and at least part of the carbon dioxide and carbon monoxide, being removed by a pressure swing desorption process producing a product gas stream containing hydrogen and nitrogen and a waste gas stream containing carbon dioxide, nitrogen, methane, carbon monoxide, and some hydrogen; and (f) burning the waste gas stream and, by heat exchange with the combustion products thereof, heating the steam and/or the gas containing nitrogen and oxygen, whereby the heated gas stream formed from said stream and said gas containing nitrogen and oxygen has said temperature above 500° C.

2. A process according to claim 1 wherein the heated gas stream is produced by heating a mixture of steam and the gas containing nitrogen and oxygen by heat exchange with the products of the combustion of the waste gas stream, at least part of the steam in said mixture being introduced by contacting the gas containing nitrogen and oxygen with hot water.

3. A process according to claim 2 wherein heat is recovered from the shift stage by conducting the shift stage in indirect heat exchange of the gas stream undergoing the shift reaction with water and said recovered heat is transferred, directly or indirectly, to the water with which the gas containing nitrogen and oxygen is contacted.

4. A process according to claim 1 wherein the shift stage is conducted in indirect heat exchange of the gas stream undergoing the shift reaction with water whereby the shift outlet temperature is 10° to 30° C. lower than the shift inlet temperature.

5. A process according to claim 1 wherein the amount of gas containing nitrogen and oxygen employed is such that there are 0.2 to 0.6 molecules of oxygen for each atom of hydrocarbon carbon in the hydrocarbon feedstock.

6. A process according to claim 1 wherein, after heating the steam and/or gas containing nitrogen and oxygen, the waste gas combustion products are let down in a turbine.

7. A process according to claim 6 wherein the turbine drives a compressor compressing the gas containing nitrogen and oxygen.

8. A process according to claim 6 wherein heat is recovered from the turbine exhaust gas by indirect heat exchange with the waste gas prior to combustion thereof and/or with a mixture of steam and the gas containing nitrogen and oxygen prior to heating said mixture by indirect heat exchange with the waste gas combustion products to form the heated gas stream.

9. A process according to claim 1 wherein carbon dioxide is removed, by contact with a liquid carbon dioxide absorbent, from the raw gas stream prior to the pressure swing adsorption stage and/or from the pressure swing adsorption waste gas stream prior to combustion thereof.

* * * * *